(12) United States Patent
Murphy

(10) Patent No.: US 11,059,113 B2
(45) Date of Patent: Jul. 13, 2021

(54) SLITTING MACHINE

(71) Applicant: ROLLEM PATENT PRODUCTS LIMITED, Barnsley (GB)

(72) Inventor: Stuart John Murphy, Barnsley (GB)

(73) Assignee: ROLLEM PATENT PRODUCTS LIMITED, South Yorkshire (GB)

(*) Notice: Subject to any disclaimer, the term of this patent is extended or adjusted under 35 U.S.C. 154(b) by 216 days.

(21) Appl. No.: 16/464,349

(22) PCT Filed: Nov. 30, 2017

(86) PCT No.: PCT/GB2017/053626
§ 371 (c)(1),
(2) Date: May 28, 2019

(87) PCT Pub. No.: WO2018/100388
PCT Pub. Date: Jun. 7, 2018

(65) Prior Publication Data
US 2021/0107073 A1    Apr. 15, 2021

(30) Foreign Application Priority Data
Nov. 30, 2016    (GB) ..................................... 1620368

(51) Int. Cl.
*B23D 19/06* (2006.01)
*B26D 1/15* (2006.01)
*B26D 7/18* (2006.01)
(Continued)

(52) U.S. Cl.
CPC ............. *B23D 19/06* (2013.01); *B26D 1/151* (2013.01); *B23D 5/02* (2013.01); *B26D 1/0006* (2013.01);
(Continued)

(58) Field of Classification Search
CPC .......... B23D 19/06; B23D 5/02; B26D 1/151; B26D 1/20; B26D 1/0006; B26D 1/21; B26D 7/18; B26D 7/2635; B26D 7/2621; B26D 2001/006; B26D 2001/0046; B26D 9/00; B26F 1/0092
(Continued)

(56) References Cited

U.S. PATENT DOCUMENTS 3,258,380 A * 6/1966 Fischer .................. B26D 11/00
                                                                  156/207
3,845,682 A   11/1974 Willhite et al.
(Continued)

OTHER PUBLICATIONS

Search Report dated Mar. 24, 2017 for Application No. GB1620368.9.
(Continued)

*Primary Examiner* — Kenneth E Peterson
*Assistant Examiner* — Nhat Chieu Q Do
(74) *Attorney, Agent, or Firm* — Patterson & Sheridan, LLP

(57) ABSTRACT

A slitting machine for removing a strip from a sheet of material. The slitting machine has a blade assembly with first and second cutting blades, and a perforating blade arranged between the first and second cutting blades. The first and second cutting blades are arranged to cut the sheet of material to define the strip and the perforating blade is arranged to perforate the sheet of material to define an end of the strip.

12 Claims, 5 Drawing Sheets

(51) Int. Cl.
  *B26D 7/26* (2006.01)
  *B26F 1/20* (2006.01)
  *B26D 1/00* (2006.01)
  *B26D 9/00* (2006.01)
  *B23D 5/02* (2006.01)
  *B26D 1/24* (2006.01)

(52) U.S. Cl.
  CPC ............... *B26D 1/24* (2013.01); *B26D 7/18* (2013.01); *B26D 7/2635* (2013.01); *B26D 9/00* (2013.01); *B26D 2001/006* (2013.01); *B26D 2001/0046* (2013.01); *B26F 1/20* (2013.01)

(58) Field of Classification Search
  USPC .......... 83/302–308, 407, 676–678, 649, 873
  See application file for complete search history.

(56) References Cited

U.S. PATENT DOCUMENTS

| | | | |
|---|---|---|---|
| 3,978,752 A | | 9/1976 | Meaden et al. |
| 4,171,080 A | * | 10/1979 | Rogers .................. B26D 3/161 |
| | | | 225/103 |
| 4,916,991 A | * | 4/1990 | Hertrich .................. B41F 13/56 |
| | | | 83/302 |
| 5,309,962 A | * | 5/1994 | McCord, Jr. ......... B23D 61/021 |
| | | | 144/222 |
| 5,768,969 A | | 6/1998 | Dalfiume |
| 6,394,330 B1 | * | 5/2002 | Jackson .................. B65H 35/02 |
| | | | 225/2 |
| 2003/0221772 A1 | * | 12/2003 | Allwein .................... B26F 1/20 |
| | | | 156/256 |
| 2005/0039582 A1 | * | 2/2005 | McCluskey ............... B31F 1/10 |
| | | | 83/13 |
| 2010/0186760 A1 | * | 7/2010 | Sieredzinski ........ B23D 61/025 |
| | | | 131/280 |
| 2011/0049781 A1 | | 3/2011 | Lewalski et al. |
| 2014/0121085 A1 | * | 5/2014 | Kwarta .................... B26D 9/00 |
| | | | 483/10 |

OTHER PUBLICATIONS

International Search Report dated Mar. 19, 2018 for Application No. PCT/GB2017/053626.

* cited by examiner

SLITTING MACHINE

FIELD OF THE INVENTION

The present invention relates to a slitting machine for removing a strip from a sheet of material, a blade assembly for a slitting machine and a method for removing a strip from a sheet of material.

BACKGROUND OF THE INVENTION

When printing small items, like business cards, it is common to print a grid of the item on a single sheet of card. The printed sheet is then cut up into individual finished items. To ensure that the printed design extends to the very edge of the finished items, neighbouring items on the sheet are separated by a gutter with the printed design bleeding into the gutter. Gutters can be removed using a slitting machine which has a number of circular blades each aligned with an edge of a gutter.

To cut business cards and other small items, it is usually necessary to cut the sheet along a first direction and a second orthogonal direction. Each pass through a slitting machine cuts the sheet along one direction. So, the sheet is usually passed through two consecutive slitting machines—a first slitting machine cuts the sheet along the first direction and a second slitting machine cuts the sheet along the second orthogonal direction.

Rather than cutting the sheet completely from edge-to-edge in the first slitting machine, it is desirable to remove a strip from the sheet which removes all of the gutters along the first direction but leaves a narrow border around the edge of the sheet. The narrow border holds the sheet together for the second slitting machine and helps to maintain alignment of the items with the cutting blades in the second slitting machine.

FIG. 1 shows an example of a cutting-perforating blade 90 of the type commonly used in slitting machines to remove a gutter while leaving a border around the edge of the sheet. The blade 90 has teeth 94 which can perforate the sheet of material. The hollows 92 between the teeth 94 are sharpened to act as a cutting blade. Pressing the blade 90 lightly against the sheet of material engages the teeth 94 with the sheet of material, perforating the sheet. Pressing the blade 90 more firmly against the sheet of material engages the hollows 92 with the sheet of material, cutting the sheet.

To remove a gutter, a slitting machine has a pair of blades 90 aligned with opposite sides of the gutter. A conveyor belt feeds a sheet of material into the slitting machine. Initially, the pair of blades 90 are disengaged from the sheet of material in order to form a border adjacent to the leading edge of the sheet of material. At the start of the gutter, the teeth 94 are engaged with the sheet to form perforations before the blade 90 is pressed more firmly against the sheet engaging the hollows 92 to start cutting the edges of the gutter.

Once the end of the gutter is reached, the blade 90 is lifted so that the hollows 92 are disengaged from the sheet of material but the teeth 94 are still engaged to cut perforations at the end of the gutter. The blades 90 are then disengaged completely from the sheet to form an uncut border adjacent to the trailing edge of the sheet. The perforations allow a strip to be torn from the sheet of material to remove the gutter while leaving a border around the sheet of material to hold the sheet together.

There are a number of drawbacks with existing slitting machines which use blades, such as blade 90. The perforating teeth 94 tend to be fairly thin, making them prone to damage. It is not possible to make the perforating teeth 94 thicker without impairing the cutting performance of the hollows 92. The blade 90 is difficult to manufacture, since the presence of the perforating teeth 94 make it difficult to grind the hollows 92 into a cutting blade. As a result, replacement blades are expensive. Damaged blades must be replaced, meaning the slitting machine must be taken out of action, resulting in lost revenue.

It would therefore be desirable to find an improved way to remove a gutter from a sheet of material which addresses these problems.

SUMMARY OF THE INVENTION

According to a first aspect of the invention, there is provided a slitting machine for removing a strip from a sheet of material. The slitting machine comprises a blade assembly. The blade assembly comprises first and second cutting blades and a perforating blade. The first and second cutting blades are configured to cut the sheet of material to define the strip. The perforating blade is arranged between the first and second cutting blades and the perforating blade is configured to perforate the sheet of material to define an end of the strip.

An advantage of this arrangement is that it avoids the need to manufacture a cutting-perforating blade, thereby avoiding the difficulties and expense involved in grinding a cutting-perforating blade, and avoiding the constraints placed on cutting and perforating performance by a blade which must perform the task of both cutting and perforating. Instead, individual cutting and perforating blades can be used, which enables standard off-the-shelf blades to be used in the blade assembly. It also allows the cutting and perforating blades to be optimised individually for cutting and perforating performance, which leads to superior cutting and perforating performance. Superior cutting performance is possible because the cutting blades can have a fully circular profile which provides a smooth cut edge. In contrast, previous cutting-perforating blades could never have a fully circular cutting edge because the cutting edge was interrupted by the perforating teeth. Difficulties in grinding the blade meant that the cutting edge could leave a saw tooth pattern (in extreme cases, making the material appear as if it were cut with pinking shears). As a result, combination cutting-perforating blades have tended to produce a ragged cut, with the material appearing to have been nibbled away with fibres being dislodged from fibrous materials, such as paper, giving a fluffy edge. In addition, the present blade assembly offers more flexibility in the shape of the perforating blade, which leads to enhanced perforating performance that allows the strip of material to be removed more cleanly.

Previous designs required two expensive cutting-perforating blades to cut each strip. It might be expected that the present arrangement would be more expensive because it requires three blades. However, the overall cost of the three blades is significantly less than the cost of two cutting-perforating blades. Hence, the claimed arrangement is cheaper to manufacture and offers enhanced performance. As well as being cheaper to manufacture, the individual cutting and perforating blades in the blade assembly tend to last longer because, unlike the previous cutting-perforating blades, they do not have delicate teeth and hollows which can be damaged (chipped) by a bottom blade in the slitting machine. Instead, the cutting blades have a circular profile which is less likely to be damaged by the circular profile of the bottom blade. Without the constraint of needing to grind a blade to act as a cutting-perforating blade, the perforating blade in the blade assembly can have more robust teeth which are less prone to damage.

The blade assembly enables enhanced perforating blade performance because the shape of the blade is not dictated by a need to grind a blade which also has cutting edges.

The perforating blade may be a crosscutting perforating blade configured to cut a perforation across the strip (for example, across a short axis of the strip). Cutting the perforation across the strip may define a start and/or end of the strip. Cutting a perforation across the strip may allow one or more ends of the strip of material to be removed more cleanly and easily, resulting in a better quality finish. It would not be possible to grind a cutting-perforating blade to the shape required to be able to both crosscut and slice a sheet of material.

The slitting machine may further comprise a mechanism configured to adjust a distance between the blades and the sheet of material in order to selectively engage the cutting blades and/or the perforating blade with the sheet of material.

The blade assembly may further comprise a first member spaced apart from a second member in order to form a gap between the first member and the second member. The mechanism may urge the first and second cutting blades towards the first and second members respectively, while urging the perforating blade towards the gap. The first and second members may be first and second bottom blades. Having separate cutting and perforating blades allows the cutting blades to be offset from the perforating blade, with the first and second cutting blades cutting against the first and second member while the perforating blade is received in the gap, reducing wear and tear on the perforating blade and therefore the frequency at which the perforating blade must be replaced.

The perforating blade may have a greater diameter than the first and second cutting blades. This allows the perforating blade to engage the sheet of material without also engaging the cutting blades in order to form a perforation at a start and end of the strip.

The mechanism may be configured to engage the perforating blade at a start and/or end of the strip.

The mechanism may be configured to engage the cutting blades between a start and end of the strip.

The mechanism may be configured to engage the perforating blade at a start of the strip to form a starting perforation and engage the cutting blades between the start and an end of the strip, wherein engaging the cutting blades tears the starting perforation. The starting perforation allows the start of the strip to tear neatly and easily from the sheet of material, detaching the start of the strip from the sheet of material. When the cutting blades engage the sheet of material, part of the blade assembly (such as the perforating blade) pulls on the strip, tearing the perforation, to easily and neatly detach the strip.

The blade assembly may further comprise a strip remover. The strip remover pushes a detached strip of material out of the blade assembly. A first strip remover may be located adjacent to the cutting blades, in order to push the strip out of the blade assembly. The first strip remover may comprise a protrusion extending beyond the trailing edge of the cutting blades. The protrusion may be configured to urge the strip out of the blade assembly. A second strip remover may be located in the gap between the first and second member. The second strip remover may extend from the gap, preferably on the trailing edge of the blade assembly. The second strip remover may push out any detached strips that may have become stuck in the gap between the first and second member.

The cutting blades and perforating blade may be coupled to a shaft. The mechanism may adjust the distance by moving the shaft relative to the sheet of material.

The mechanism may comprise a wrap spring clutch arranged to move the shaft.

According to a second aspect of the invention, there is provided a blade assembly for a slitting machine. The blade assembly comprises first and second cutting blades configured to cut a sheet of material to define a strip, and a perforating blade arranged between the first and second cutting blades, the perforating blade configured to perforate the sheet of material to define an end of the strip.

The perforating blade may be a crosscutting perforating blade configured to cut a perforation across the strip (for example, across a short axis of the strip). Cutting the perforation across the strip may define a start and/or end of the strip. Cutting a perforation across the strip may allow one or more ends of the strip of material to be removed more cleanly and easily, resulting in a better quality finish. It would not be possible to grind a cutting-perforating blade to the shape required to be able to both crosscut and slice a sheet of material.

The blade assembly may further comprise a first member spaced apart from a second member in order to form a gap between the first member and the second member such that, in use, the first and second cutting blades are urged towards the first and second members respectively, while the perforating blade is urged towards the gap. The first and second members may be first and second bottom blades. Having separate cutting and perforating blades allows the cutting blades to be offset from the perforating blade, with the first and second cutting blades cutting against the first and second member while the perforating blade is received in the gap, reducing wear and tear on the perforating blade and therefore the frequency at which the perforating blade must be replaced.

The perforating blade may have a greater diameter than the first and second cutting blades. This allows the perforating blade to engage the sheet of material without also engaging the cutting blades in order to form a perforation at a start and end of the strip.

The blade assembly may further comprise a strip remover. The strip remover pushes a detached strip of material out of the blade assembly. A first strip remover may be located adjacent to the cutting blades, in order to push the strip out of the blade assembly. The first strip remover may comprise a protrusion extending beyond the trailing edge of the cutting blades. The protrusion may be configured to urge the strip out of the blade assembly. A second strip remover may be located in the gap between the first and second member. The second strip remover may extend from the gap, preferably on the trailing edge of the blade assembly. The second strip removed may push out any detached strips that may have become stuck in the gap between the first and second member.

According to a third aspect of the invention, there is provided a method for removing a strip from a sheet of material using a slitting machine according to the first aspect. The method comprises feeding a sheet of material into the slitting machine, engaging the first and second cutting blades to cut the sheet of material to define a strip, and engaging the perforating blades at an end of the strip to perforate the material at the end of the strip.

In any of the aspects, the strip may be a gutter between neighbouring printed items. The sheet of material may be a sheet of printed material. The sheet of material may be paper, cardboard, plastic or foil.

BRIEF DESCRIPTION OF THE DRAWINGS

The invention shall now be described, by way of example, with reference to the accompanying drawings in which.

DETAILED DESCRIPTION

Figure 1:
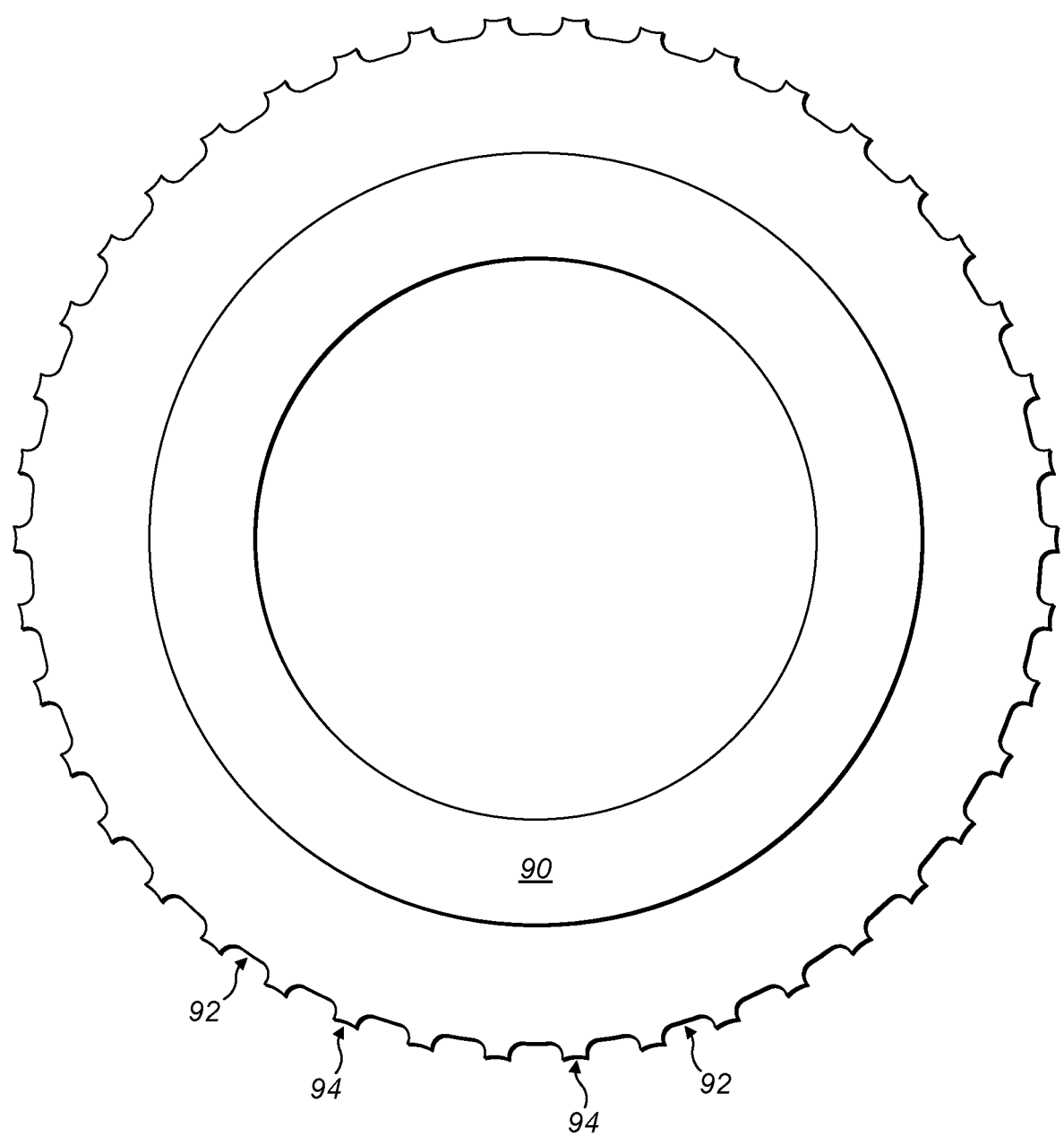
FIG. 1 shows a prior art blade for removing a gutter.
Figure 2:
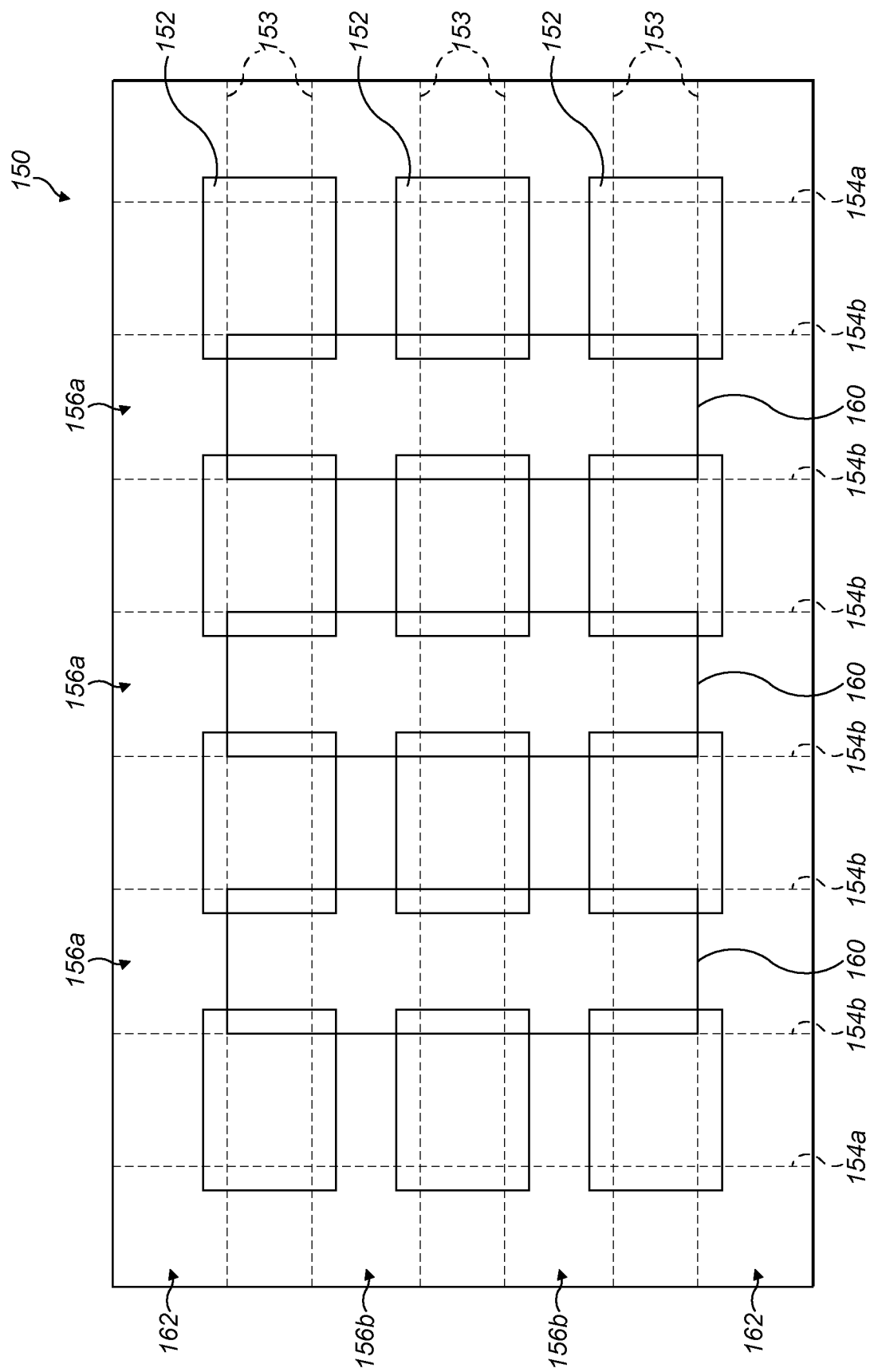
FIG. 2 illustrates a printed sheet of items prior to cutting into individual items.

FIG. 2 illustrates a sheet of material, in this example card 150. The card 150 is printed with a grid of items, such as business cards 152, which need to be cut into individual business cards 152. To ensure that the printed design extends to the very edge of each finished business card 152, neighbouring business cards 152 printed on the card 150 are separated by a gutter 156 and the printed design bleeds into the gutter 156.

To produce finished business cards 152, the card 150 needs to be cut along the horizontal cutting lines 153 and vertical cutting lines 154 (indicated by the dashed lines on FIG. 2). The card 150 can be cut using a slitting machine which has a number of circular blades each aligned with a cutting line. Each pass through a slitting machine cuts the card 150 along one cutting direction, aligned with either the horizontal cutting lines 153 or the vertical cutting lines 154. So, the card 150 is usually passed through two consecutive slitting machines—a first slitting machine cuts the card 150 along a first direction and the second slitting machine cuts the card 150 along the second orthogonal direction. In this example, the first slitting machine cuts the card 150 along the vertical cutting lines 154 and the second slitting machine cuts the card 150 along the horizontal cutting lines 153

Rather than cutting the card 150 completely from edge-to-edge along the first direction (that is, along the vertical cutting lines 154) in the first slitting machine, it is desirable instead to remove strips 160 from the card 150 to remove the portion of the vertical gutters 156a between neighbouring business cards 152 in the vertical direction while leaving a border 162 along the top and bottom horizontal edges of the card 150. The border 162 holds the card 150 together for the second slitting machine and helps to maintain alignment of the horizontal cutting lines 153 with the cutting blades in the second slitting machine.

Figure 3:
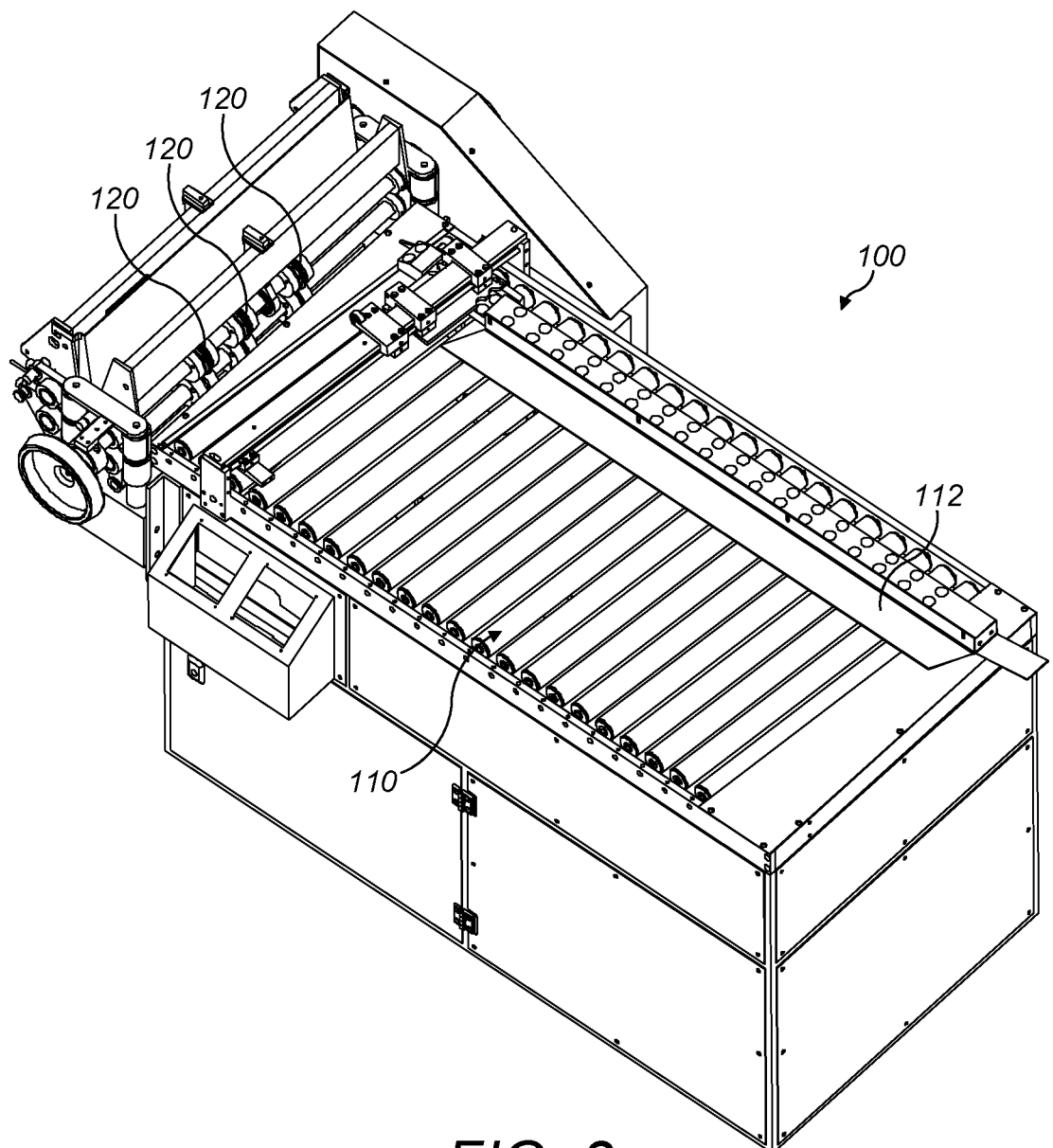
FIG. 3 illustrates a slitting machine incorporating a plurality of blade assemblies according to an embodiment of the present invention.

FIG. 3 illustrates an example of a slitting machine 100 which can be used as a first slitting machine for removing strips 160 from card 150. The slitting machine 100 has a conveyor belt 110 onto which the card 150 is loaded, either by hand or directly from a printing or print finishing machine. A guide 112 ensures that the card 150 is correctly aligned with the slitting machine 110, so that each strip 160 is aligned with a strip-removing blade assembly 120. The conveyor belt 110 is angled with respect to the guide 112 so that the conveyor belt 110 urges the card 150 against the guide 112 in order to ensure good alignment with the blade assemblies 120.

Figure 4:
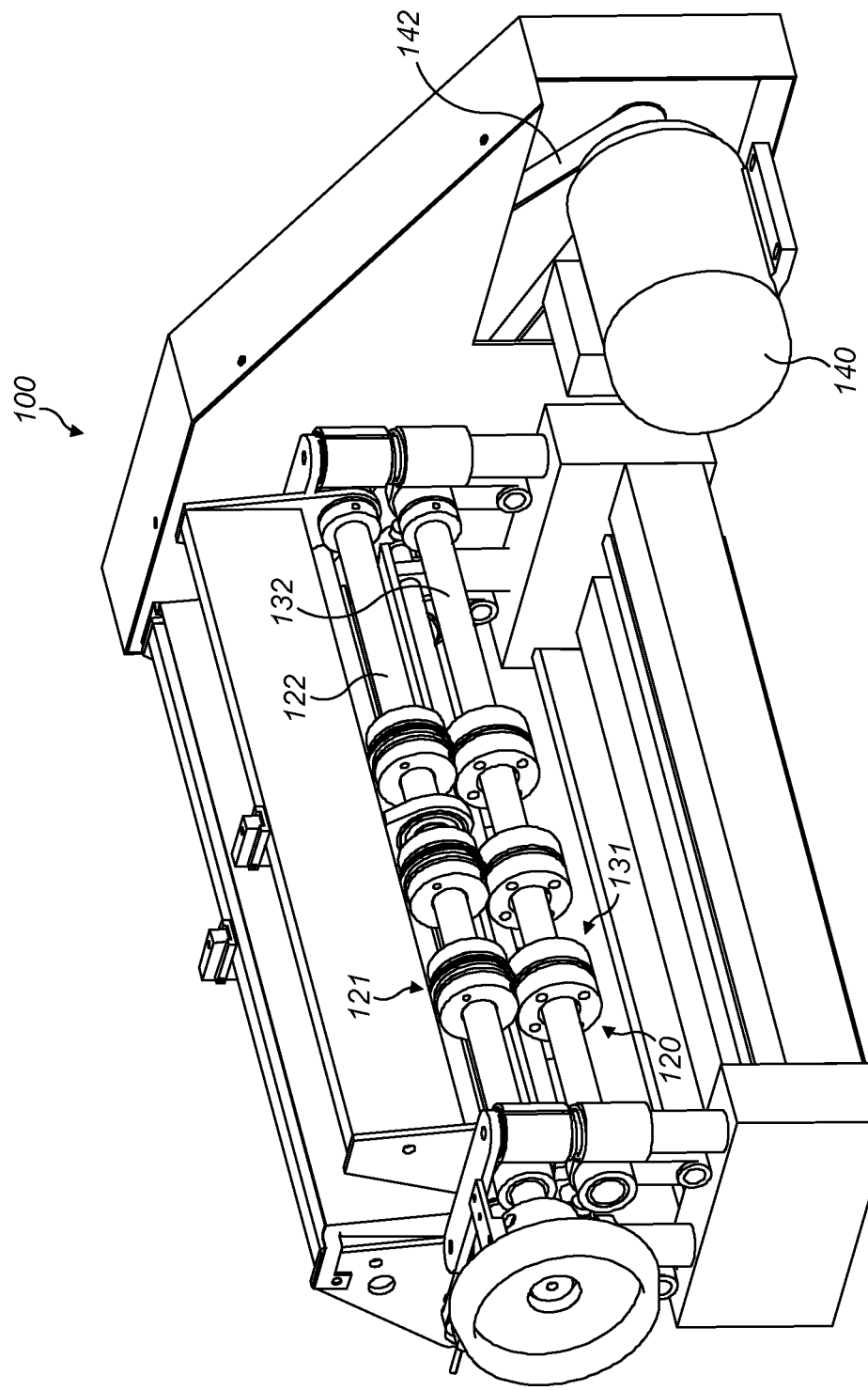
FIG. 4 illustrates the slitting machine of FIG. 3 with the conveyor belt removed so that the blade assemblies can be seen more clearly.
Figure 5:
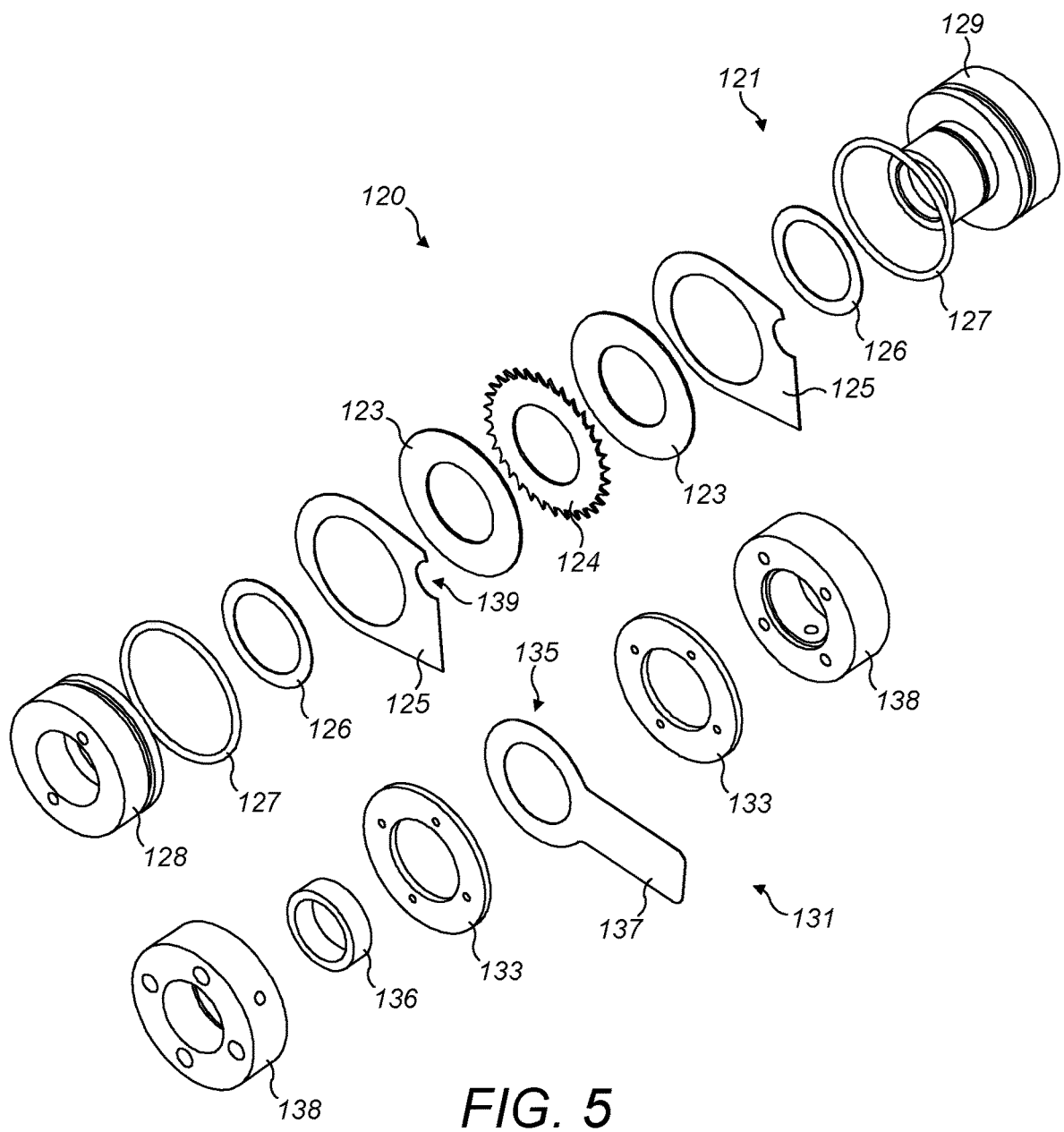
FIG. 5 is an exploded view of a blade assembly of FIGS. 3 and 4, illustrating each individual component of the blade assembly.

FIG. 4 illustrates the slitting machine 100 of FIG. 3 with the conveyor belt 110 removed so that the blade assemblies 120 can be seen more clearly. FIG. 5 is an exploded view of a blade assembly 120 showing each of the individual components. The blade assembly 120 includes a top blade assembly 121 and a bottom blade assembly 131.

The top blade assembly 121 has a crosscutting perforating blade 124 sandwiched between a first cutting blade 123 and a second cutting blade 123 so as to offset the first and second cutting blades 123 to define the width of the strip 160. Either side of the cutting blades 123 is located a stripper 125, a spacer 126 and an O-ring 127. The components of the top blade assembly 121 are held together between nut 128 and bolt 129.

The bottom blade assembly 131 has a first bottom blade 133 and a second bottom blade 133. A gap spacer 135 is located between the first bottom blade 133 and the second bottom blade 133. The gap spacer 135 has a smaller diameter than the first and second bottom blades 133, in order to define a gap between the first and second bottom blades 133. The components of the bottom blade assembly 131 are held together between a pair of end caps 138 which are fastened together through the holes provided in each component of the bottom blade assembly 131. The first bottom blade 133, second bottom blade 133 and the gap spacer 135 rotate around a core 136 which is typically made of hardened steel to prevent the core 136 from wearing excessively.

The top blade assembly 121 is attached to top shaft 122 and the bottom blade assembly 131 is attached to the bottom shaft 132. In use, the top shaft 122 and bottom shaft 132 are rotated by a mechanism (including motor 140 and belt 142) as the card 150 is fed into the slitting machine 150 on the conveyor belt 110.

The mechanism controls the distance between the top shaft 122 and the bottom shaft 132, controlling the distance between the top blade assembly 121 and the bottom blade assembly 131. As the perforating blade 124 has a greater diameter than the first and second cutting blades 123, controlling the distance selects whether to engage only the perforating blade 124 with the card 150, or whether to also engage the cutting blades 123.

In use, the conveyor belt 110 feeds the card 150 into the slitting machine 100. Initially, the mechanism adjusts the distance between the top shaft 122 and bottom shaft 132 so that both the cutting blades 123 and the perforating blade 124 are completely disengaged from the card 150 in order to form uncut border 162 adjacent to the leading horizontal edge of the card 150.

At the start of the strip 160, the mechanism adjusts the distance between the top shaft 122 and bottom shaft 132 so that only the perforating blade 124 is engaged with the card 150. The perforating blade 124 makes a starting perforation to define the start of the strip 160. The perforating blade 124 forms a crosscut across the width of the strip 160 (that is, across the short axis of the strip 160), which allows the start of the strip 160 to tear neatly and easily from the card 150 in order to detach the start of the strip 160 from the card 150.

After the perforation has been formed, the mechanism further reduces the distance between the top shaft 122 and bottom shaft 132, urging each cutting blade 123 towards its respective bottom blade 133 in order to cut the sides of the strip 160 (that is, cutting along the long axis of the strip 160, in the direction of the vertical cutting lines 154b). The perforating blade 124 is urged towards the gap between the pair of bottom blades 133 to avoid damaging the perforating blade 124. When the cutting blades 123 engage the card 150, the perforating blade 124 also remains engaged with the card 150 which tends to pulls on the strip 160, tearing the starting perforation to easily and neatly detach the starting end of the strip 160.

Once the end of the strip 160 is reached, the mechanism adjusts the distance between the top shaft 122 and bottom shaft 132 so that only the perforating blade 124 is engaged with the card 150. The perforating blade 124 makes an ending perforation to define the end of the strip 160. The perforating blade 124 forms a crosscut across the width of the strip 160, which allows the end of the strip 160 to tear neatly and easily from the card 150 in order to completely detach the strip 160 from the card 150.

The mechanism adjusts the distance between the top shaft 122 and bottom shaft 132 so that both the cutting blades 123 and the perforating blade 124 are disengaged from the card 150 in order to form an uncut border 162 adjacent to the trailing horizontal edge of the card 150.

The top blade assembly 121 has a pair of strippers 125 which extend beyond the trailing edge of the cutting blades 123. The strippers 125 encourage the detached strip 160 (or the detached first end of the strip 160) away from the blade assembly 120, to prevent the strip 160 fouling the blade assembly 120. Each stripper 125 has a notch 139 which mates with a fixed bar to stop the stripper 125 from rotating with the rest of the blades assembly 120.

The gap spacer 135 in the bottom blade assembly 131 has a protrusion 137 which extends from the gap on the trailing edge of the blade assembly 120. The protrusion 137 pushes out a strip 160 that may have become stuck in the gap.

The card 150 will now have had all of the strips 160 removed and may be passed into a second slitting machine to cut the card 150 along the horizontal cutting lines 153. The border 162 holds the card 150 together for the second slitting machine and helps to maintain alignment of the horizontal cutting lines 153 with the cutting blades in the second slitting machine. Usually the cutting blades in the second slitting machine will be simple cutting blades each aligned with a horizontal cutting line 153. The second slitting machine does not usually need to have a blade assembly 120 comprising cutting and perforating blades, unless it is desirable to maintain an uncut border 160 around the entire sheet of card 150 to aid further processing.

Although the invention has been described in terms of certain embodiments, the skilled person will appreciate that various modifications can be made without departing from the scope of the appended claims.

The slitting machine 100 may have additional cutting blades (not shown) aligned with the outer vertical cutting lines 154a, such as simple cutting blades to remove the vertical edges of the card 150.

The item has been described as being a business card 152, however the item could be any printed item. In particular, an item which is smaller than the sheet of material meaning that multiple items are printed on the page and the individual items are cut out after printing.

Any number of items could be printed on a sheet of material and the slitting machine 100 could be configured to have as many blade assemblies as are necessary to remove the desired number of strips between items.

Although the sheet of material has been described as a sheet of printed material, the sheet of material need not be printed as the slitting machine and blade assembly are equally applicable to a sheet of material which has not been printed.

Instead of card, the sheet of material could be paper, plastic, foil or any other material, particularly materials containing individual printed items with a gutter.

Although the above example describes the first slitting machine cutting the card 150 along the vertical cutting lines 154 and the second slitting machine cutting the card 150 along the horizontal cutting lines 153, there is no reason why the horizontal cutting lines 153 could not be cut first and the vertical cutting lines 154 cut second. In this case, the strip would be aligned with the horizontal gutters 156b and the uncut border would be on the vertical edges of the card 150.

The invention claimed is:

1. A slitting machine for removing a strip from a sheet of material, the slitting machine comprising:
    a blade assembly comprising:
        first and second cutting blades configured to cut the sheet of material to define the strip;
        a perforating blade arranged between the first and second cutting blades, the perforating blade configured to perforate the sheet of material to define an end of the strip, the perforating blade having a greater diameter than the first and second cutting blades; and
        a mechanism configured to adjust a distance between the blades and the sheet of material in order to selectively engage the cutting blades and/or the perforating blade with the sheet of material, the cutting blades and perforating blade being coupled to a shaft, and the mechanism being configured to adjust the distance by moving the shaft relative to the sheet of material.

2. The slitting machine of claim 1, wherein the perforating blade is a crosscutting perforating blade configured to cut a perforation across the strip.

3. The slitting machine of claim 1, wherein the blade assembly further comprises a first member spaced apart from a second member in order to form a gap between the first member and the second member, wherein the mechanism urges the first and second cutting blades towards the first and second members respectively, while urging the perforating blade towards the gap.

4. The slitting machine of claim 1, wherein the mechanism is configured to engage the perforating blade at a start and end of the strip.

5. The slitting machine of claim 1, wherein the mechanism is configured to engage the cutting blades between a start and end of the strip.

6. The slitting machine of claim 1, wherein the mechanism is configured to engage the perforating blade at a start of the strip to form a starting perforation, and engage the cutting blades between the start and an end of the strip, wherein engaging the cutting blades tears the starting perforation.

7. The slitting machine of claim 1, wherein the blade assembly further comprises a strip remover.

8. A blade assembly for a slitting machine, the blade assembly comprising:
    first and second cutting blades configured to cut a sheet of material to define a strip;
    a perforating blade arranged between the first and second cutting blades, the perforating blade configured to perforate the sheet of material to define an end of the strip, the perforating blade having a greater diameter than the first and second cutting blades; and
    a mechanism configured to adjust a distance between the blades and the sheet of material in order to selectively engage the cutting blades and/or the perforating blade with the sheet of material, the cutting blades and perforating blade being coupled to a shaft, and the mechanism being configured to adjust the distance by moving the shaft relative to the sheet of material.

9. The blade assembly of claim 8, wherein the perforating blade is a crosscutting perforating blade configured to cut a perforation across the strip.

10. The blade assembly of claim 8, wherein the blade assembly further comprises a first member spaced apart from a second member in order to form a gap between the first member and the second member such that, in use, the first and second cutting blades are urged towards the first and second members respectively, while the perforating blade is urged towards the gap.

11. The blade assembly of claim 8, wherein the blade assembly further comprises a strip remover.

12. A method for removing a strip from a sheet of material using a slitting machine, the method comprising:

feeding a sheet of material into the slitting machine, the slitting machine comprising:

a blade assembly comprising:

first and second cutting blades configured to cut the sheet of material to define the strip;

a perforating blade arranged between the first and second cutting blades, the perforating blade configured to perforate the sheet of material to define an end of the strip, the perforating blade having a greater diameter than the first and second cutting blades; and a mechanism configured to adjust a distance between the blades and the sheet of material in order to selectively engage the cutting blades and/or the perforating blade with the sheet of material, the cutting blades and perforating blade being coupled to a shaft, and the mechanism being configured to adjust the distance by moving the shaft relative to the sheet of material;

engaging the first and second cutting blades to cut the sheet of material to define the strip; and engaging the perforating blade at the end of the strip to perforate the material at the end of the strip.

\* \* \* \* \*